United States Patent [19]

Cousineau

[11] 4,069,883
[45] Jan. 24, 1978

[54] SNOW VEHICLE

[76] Inventor: Richard L. Cousineau, P.O. Box 222, Big Rapids, Mich. 49307

[21] Appl. No.: 753,607

[22] Filed: Dec. 22, 1976

[51] Int. Cl.² .................. B62D 55/04; B62M 27/02
[52] U.S. Cl. .............................. 180/5 A; 180/9.2 C
[58] Field of Search .............. 180/5 R, 5 A, 9.2 C, 180/9.2 R

[56] References Cited

U.S. PATENT DOCUMENTS

| | | | |
|---|---|---|---|
| 1,425,835 | 8/1922 | Buffe | 180/9.2 C |
| 2,852,317 | 9/1958 | Riemerschmid | 180/9.2 C |
| 3,651,879 | 3/1972 | Wilson | 180/5 R |
| 3,710,886 | 1/1973 | Wagner | 180/9.2 R |
| 3,724,580 | 4/1973 | Adams | 180/9.2 R |
| 3,860,080 | 1/1975 | Firstenberg | 180/9.2 R |
| 3,933,214 | 1/1976 | Guibord | 180/9.2 R |
| 3,976,153 | 8/1976 | Lateur | 180/9.2 C |

Primary Examiner—Joseph F. Peters, Jr.
Assistant Examiner—John A. Pekar
Attorney, Agent, or Firm—Price, heneveld, Huizenga & Cooper

[57] ABSTRACT

A snow vehicle is disclosed incorporating apparatus permitting conversion from street use to snow use. The conversion apparatus includes a pair of ski assemblies attachable to the conventional, pre-existing steering system of the vehicle. A pair of endless track assemblies each including an endless flexible track, a forward drive shaft and a plurality of bogie wheels mounted in a tunnel, are positioned at the rear of the vehicle. Each endless track assembly includes mounting plates for adjustably securing the tunnel to the axle flange of the vehicle and to the vehicle frame. A power transmission system transmits power from the axle hub to the endless flexible track. A braking system permits selective braking of either or both of the tracks.

10 Claims, 13 Drawing Figures

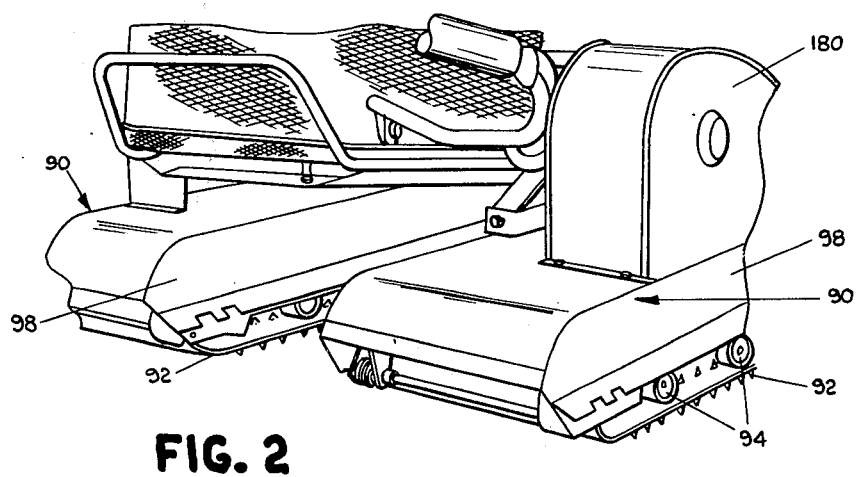
FIG. 2
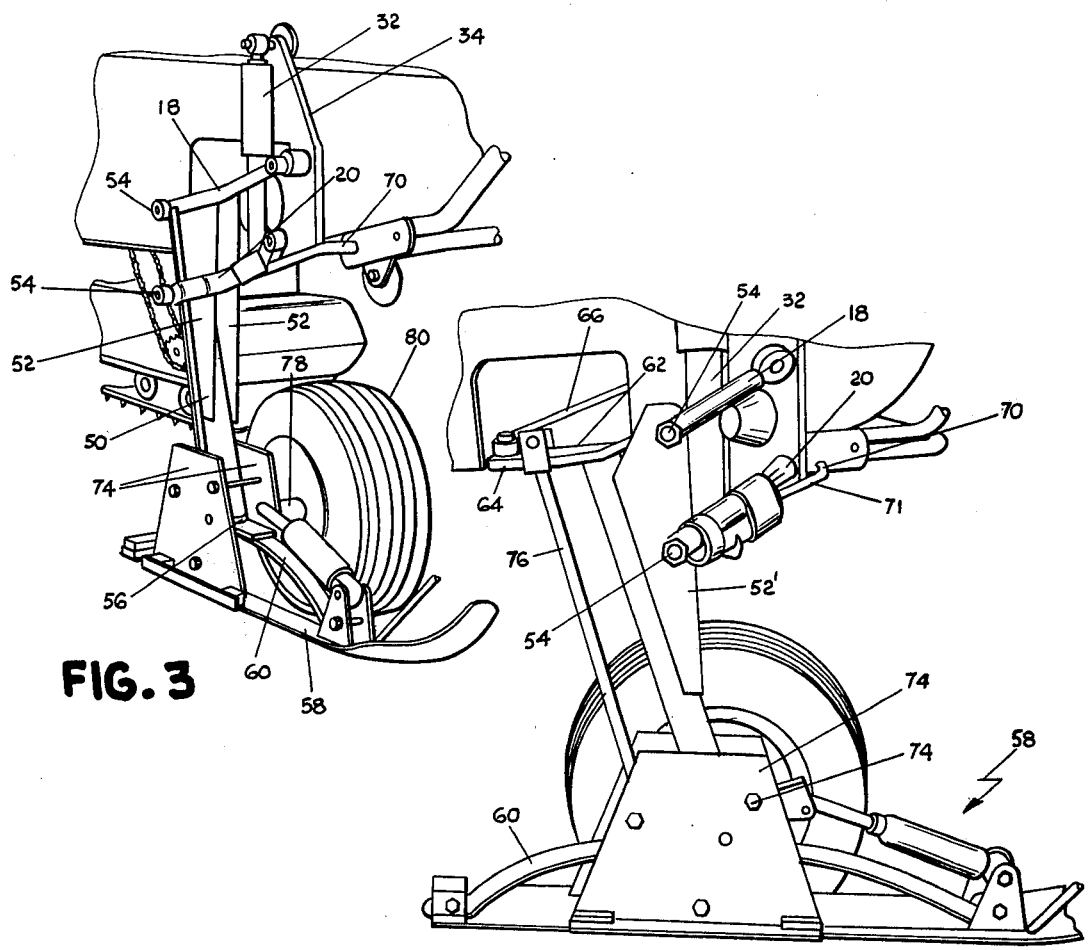
FIG. 3
FIG. 4

SNOW VEHICLE

BACKGROUND OF THE INVENTION

This invention relates to powered vehicles, and more particularly to a vehicle incorporating apparatus permitting conversion from street use to snow use.

Fairly recently there has been a rapid increase in the popularity of recreation vehicles, such as dune buggies, all-terrain vehicles and snowmobiles. A typical dune buggy type vehicle includes a tubular frame, a fiberglass body, an air cooled, rear mounted engine and drive train employing a differential and transaxle. The rear mounted engine is typically of the type manufactured by Volkswagen. These vehicles are primarily designed for street use, but may be adapted for off-road use by employing large, balloon-type tires. Other recreational vehicles are primarily of the all-terrain type not suitable for general street use. These vehicles typically employ over-sized tires and four-wheel drive arrangements. None of these types of recreational vehicles are readily usable to traverse rough, heavily snow-covered terrain.

Most available snowmobiles employ a pair of forward mounted, turnable skis, and a single, elongated endless track and bogie wheel suspension system. These snowmobiles typically employ small sized engines and are strictly limited to snow use. Further, conventional snowmobiles are open to the elements and generally carry only one or two passengers.

Various proposals have been made to provide apparatus for converting conventional vehicles or recreational vehicles for snow use. One example may be found in U.S. Pat. No. 3,976.153, entitled VEHICLE WITH REMOVABLE TRACTION APPARATUS, and issued on Aug. 24, 1976 to Michael J. Lateur. This patent discloses a pair of spaced, endless flexible tracks and a mounting structure to secure the tracks rigidly to a vehicle so that the tracks may be driven from the drive axle of the vehicle. The endless tracks are driven from the rear by a direct coupling between the rear axles of the vehicle. The endless track assemblies are interconnected by a rigid cross member. No provision is made for converting the conventional steering assembly to one more readily adapted for snow use.

Other examples of such prior attempts may be found in U.S. Pat. No 3,933,214, entitled ALL TERRAIN PLEASURE VECHICLE, and issured on Jan. 20, 1976 to Gurbord et al; U.S. Pat. No. 3,724,580, entitled CONVERTIBLE TRACK SYSTEM FOR WHEELED VEHICLE, and issued on April 3, 1973 to Adams; and U.S. Pat. No. 3,710,886, entitled MECHANISM FOR CONVERTING WHEELED VEHICLE INTO TRACK VEHICLE and issued on Jan. 16, 1973 to Wagner. The prior systems have generally been relatively complex in nature and have not permitted a fast conversion from street use to total snow use. Further, the prior systems have not taken complete advantage of proper weight distribution to increase the traction obtainable from an endless track drive arrangement.

SUMMARY OF THE INVENTION

A need exists for an apparatus for converting a conventional street or recreational vehicle for snow use and for such a converted snow vehicle which provides the benefits of a track system, provides a four-point suspension permitting traverse of difficult terrain with maximum comfort for the occupants, minimizes traction by proper weight distribution, is capable of relatively high speeds, and is rugged enough for use over rough, snow covered terrain. Essentially, the apparatus in accordance with the present invention includes a pair of ski assemblies, each securable to the trailing arms of a conventional steering system of a vehicle and each including a strut mounted to the trailing arms upon removal of the conventional front wheel spindles. A pair of endless track assemblies each including an endless flexible track, a forward drive shaft and a plurality of bogie wheels mounted within the tunnel are attached to the rear axle of the vehicle and to the frame of the vehicle. The endless track assemblies are secured to the vehicle by a first mounting plate adjustably secured to the top of the tunnel and secured to the axle flange of the vehicle. A second vehicle mounting plate is secured to the tunnel and also to the frame of the vehicle. A rigid link replaces the rear shock absorber and suspension system of the vehicle. Further, an elongated adjustable tension member extends between the vehicle frame and the second vertical mounting plate. The tension member absorbs shock loads imparted to the forward end of the vehicle. The tracks are positioned and secured to the vehicle to provide a four-point suspension and to maximize traction by proper weight distribution. Provision is made for driving the tracks at their forward drive members, indirectly through a drive member and flexible drive transmission elements driven by the rear axle of the vehicle.

Provision is made for selectively braking either or both of the endless track assemblies to aid in steering of the vehicle. Further, in narrower aspects of the invention, the first and second mounting plates are positioned so that the upward lateral edges of each of the tunnels are disposed within the vehicle width defined by the rear axle assemblies. In the preferred form, the apparatus in accordance with the present invention is combined with a recreational vehicle of the Volkswagen base type which includes a tubular frame and a rear mounted internal combustion engine and transaxle.

The vehicle is readily converted back to street use by removal of the ski assemblies, substitution of the conventional front wheel spindle and wheel assemblies and removal of the rear track assemblies followed by a replacement of the rear suspension and rear wheels.

The unique apparatus and converted snow vehicle in accordance with the present invention results in a vehicle capable of sustaining relatively high speeds, is rugged enough for use in rough, heavily snow-covered terrain and includes the advantages of a track system, a four-point suspension and maximum traction by proper weight distribution. over the track assemblies.

BRIEF DESCRIPTION OF THE DRAWINGS

FIG. 2 is a rear, perspective, fragmentary elevational view of the snow vehicle;

FIG. 3 is a front, fragmentary, perspective view of the snow vehicle showing the ski assembly and an alternative, front wheel assembly;

FIG. 4 is a side, fragmentary, elevational view of the ski and wheel assembly of FIG. 3;

DETAILED DESCRIPTION OF THE PREFERRED EMBODIMENT

Figure 1:
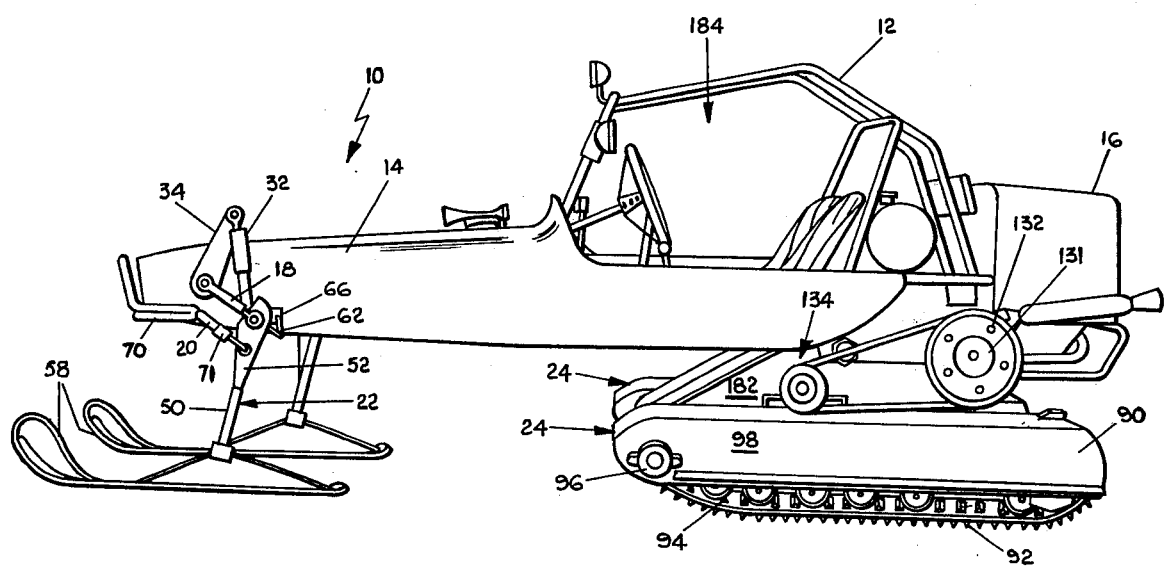
FIG. 1 is a side, elevational view of a snow vehicle and conversion apparatus in accordance with the present invention.

With reference to the drawings, FIG. 1 illustrates a vehicle generally designated 10 incorporating the conversion apparatus in accordance with the present invention. As shown therein, the vehicle includes a tubular, preferably welded frame, generally designated 12 covered by a fiberglass body 14. The vehicle includes a rear mounted engine of the Volkswagen type covered by a rear housing 16. Secured to trailing arms 18, 20 of the steering system on each side of the vehicle are ski assemblies 22. The trailing arms 18, 20 form part of the steering system of the conventional recreational vehicle. Mounted at the rear of the vehicle and to the underside thereof are a pair of track assemblies 24.

Figure 11:
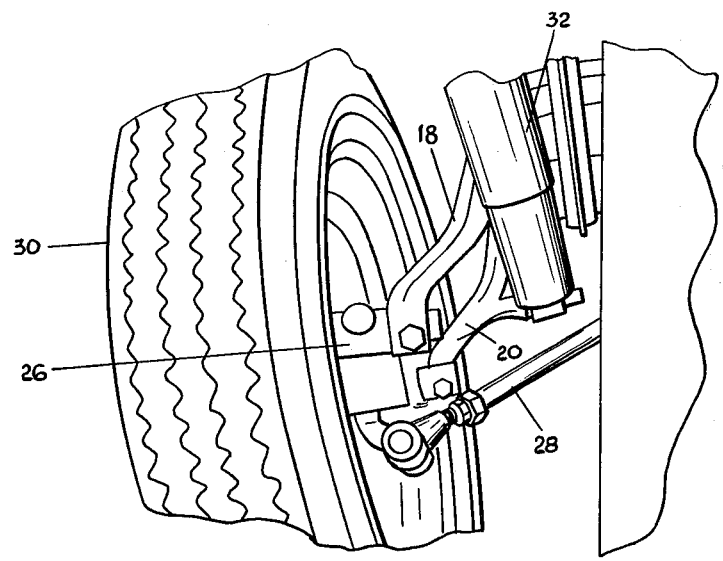
FIG. 11 is a fragmentary, perspective view showing the mounting of a conventional wheel and spindle of the vehicle.
Figure 12:
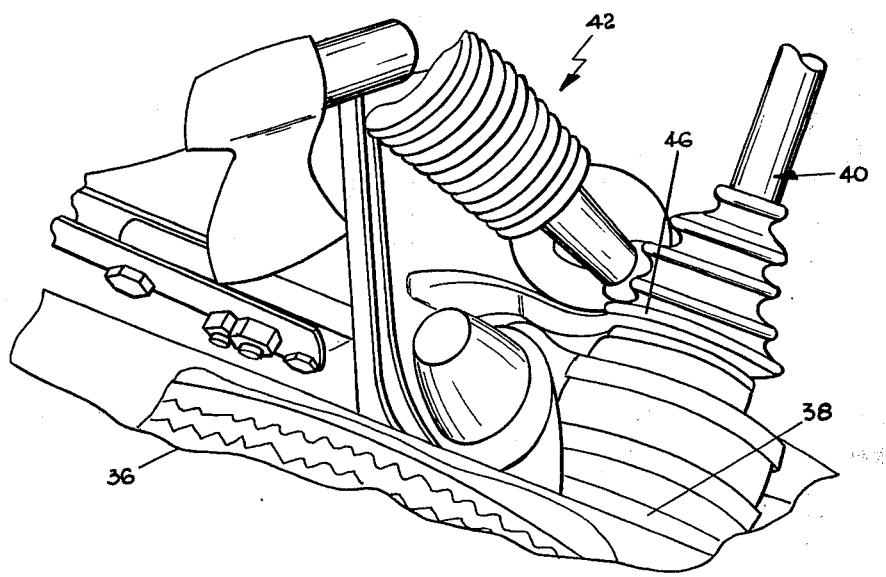
FIG. 12 is a perspective view showing the conventional rear suspension of the vehicle.

The basic structure of the vehicle including the tubular frame 12, the fiberglass body 14, the steering assembly including the trailing arms 18, 20, and the rear mounted engine are of a conventional nature. The vehicle illustrated is of the Vokswagen based, dune buggy type. As best seen in FIGs. 11 and 12, when the vehicle is intended for use as a street vehicle, the forward steering assemblies would include a wheel spindle 26 mounted to the outside of the pivotable trailing arms 18, 20. The spindle is connected to the remaining elements of the steering system (not shown) of the vehicle by a tie rod 28. The spindle 26 supports a tire 30. A shock absorber 32 would extend between one of the spindles 18, 20 and the top of a shock absorber mounting strut 34. In FIG. 1, the shock 32 is mounted on the upper spindle 18.

The rear suspension of the conventional dune buggy type vehicle includes a tire 36 mounted to a hub 38 which forms part of the rear, transaxle assembly 40. A spring and shock absorber combination 42 extends from an axle flange 46 to the vehicle frame. The axle flange is integral with the axle housing.

Each ski assembly 22, as best seen in FIGS. 1, 3 and 4, includes an elongated strut 50. The strut 50 is provided with integral mounting plates 52 secured to the inside of the spindles 18, 20 by suitable bolts 54. A ski shaft 56 is rotatably disposed within and extends downwardly through the strut 50. The ski shaft 56 is nonrotatably connected at its lower end to a ski 58 through a leaf spring type suspension 60. The ski 58 is of a conventional type such as found on presently available snowmobiles. The upper end of the ski shaft 56 is secured to a lever arm 62. The lever arm 62 is secured at its free end 64 to a tie rod 66.

In converting the conventional wheeled front end of the vehicle to the ski front end, the tie rod 28 illustrated in FIG. 11 must be replaced by the tie rod 66 since the ski strut is mounted on the inside of the trailing arms 18, 20. The ski assemblies are mounted on the inside of the trailing arms to reduce the front track or distance between the fron skis to thereby increase the ease by which the vehicle may be steered. The front suspension of the vehicle remains the same and includes a torsion rod 70 having a generally U-shaped configuration, the legs 71 of which are secured to the lower trailing arms 20. The shock absorber 32 extends downwardly from the shock absorber mounting strut 34 to one of the trailfng arms 18, 20, preferably the lower arm 20.

In the embodiment illustrated in FIGS. 3 and 4, the front ski assemblies have been adapted for street use. This adaptation is obtained by securing a pair of plates 74 on the sides of the strut 50. Elongated rods 76 extend from the lever arm 62 downwardly to the skis to hold them in a level position. The inner plate 74 carries a spindle 78 upon which is rotatably mounted a trailer type wheel and bearing assembly 80. This simple arrangement permits use of the vehicle with or without the rear track assemblies 24 on the street when there is little or no snow present.

Each track assembly 24 includes an elongated, generally rectangular tunnel 90. Mounted within the tunnel 90 is an endless track 92 engaged by a bogie wheel suspension system including a plurality of bogie wheels 94. The track 92 is driven by a forwardly located drive shaft 96 which is rotatably mounted between the side walls 98 of the tunnel 90. The endless track 92 and the bogie wheel suspension 94 are conventional, readily available items which may be taken, for example, from an existing snowmobile and mounted within the specially fabricated tunnel 90.

Figure 5:
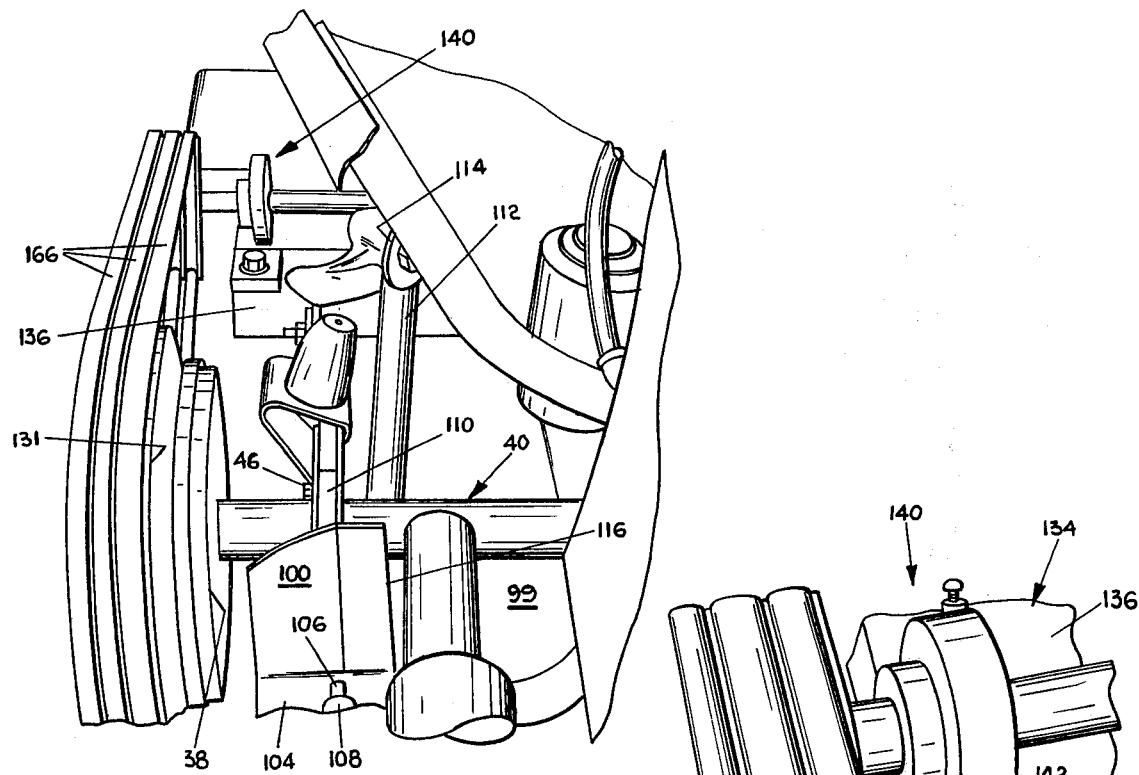
FIG. 5 is a rear, fragmentary, perspective view showing a portion of the mounting arrangement for the track assemblies.
Figure 7:
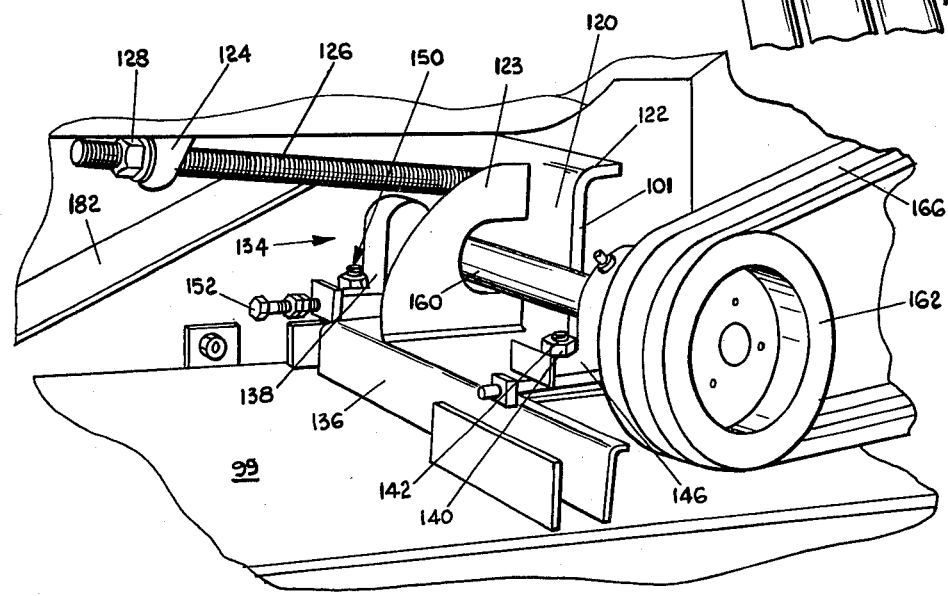
FIG. 7 is a fragmentary, perspective view showing another portion of the drive and mounting arrangement for the rear track assemblies.
Figure 8:
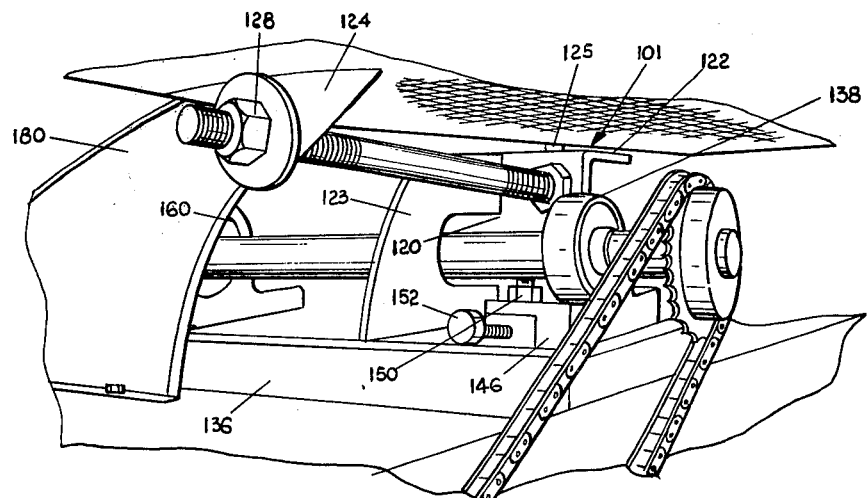
FIG. 8 is a perspective view from underneath the vehicle showing the mounting arrangement and countershaft of the drive assembly.
Figure 9:
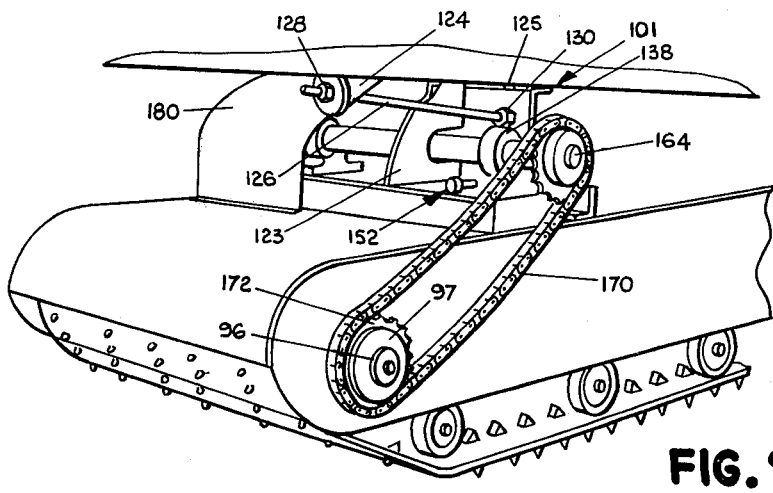
FIG. 9 is a perspective view from underneath the vehicle showing a portion of the drive arrangement.

Each of the tunnels 90 is adjustably secured to the vehicle frame and the rear axle assembly 40 of the vehicle by a pair of vertical mounting plates 100 (FIG. 5) and 101 (FIGS. 7, 8 and 9). The first plate 100 is generally L-shaped and includes a mounting flange 104 having an elongated slot 106 formed therein. The plate 100 extends generally transversely to the top wall 99 of the tunnel 90. A bolt or other suitable fastener 108 extends through the slot 106 to adjustably mount the plate 100 to the top wall 98 of the tunnel. The vertical mounting plate 100 includes a forwardly extending, integral plate 110. The plate 110 is bolted or otherwise suitably secured to the axle flange 46 of the rear axle assembly 40. The combined shock absorber and spring 42 found in the conventional vehicle illustrated in FIG. 12 is replaced by a rigid, elongated strut 112. The strut 112 is bolted at its upper end to the frame 114 and at its lower end 116 to the axle flange 46 of the vehicle. The tunnel 90 is rigidly secured to the vehicle. The suspension for each of the vehicle at the rear axle is provided totally by the bogie wheel suspension of the track assembly within the tunnel 90.

The forward or second vertical mounting plate 101 is also of a generally L-shape and includes a vertical leg 120, a horizontal leg 122 and a forward plate 123. The horizontal leg 122 is bolted or otherwise suitably secured to the frame of the vehicle through the undersurface thereof as best seen in FIGS. 8 and 9. The lower end of the vertical leg 120 is welded or otherwise suitably secured to a member 136 on the tunnel 90 as is the plate 123. Secured to the undersurface of the vehicle frame at a point forward of the second mounting plate 101 is a gusset 124. Extending from the gusset 124 to the vertical portion 120 of the second mounting plate is an elongated, tension member in the form of a threaded bolt 126. The threaded bolt 126 has adjustment and lock nuts 128, 130 threadably mounted thereon. The horizontal leg 122 of the vertical plate 101 similarly includes an elongated slot (not shown) through which a bolt 125 securing the plate to the frame extends. This permits adjustment of the tunnel relative to the vehicle at the forward mounting plate. The elongated, tension member 126 is provided to assist in adjusting the tunnel position relative to the vehicle. Also, this member absorbs impact loads applied to the front end of the tunnel and the endless track assembly. The bolt increases the rigidity of the mounting structure and the ruggedness of the vehicle track assembly combination. The tension member absorbs impact loading which would tend to twist the track assemblies relative to the vehicle frame.

The mounting for the ski assemblies and the endless track assemblies provides the vehicle with a four-point suspension which increases the comfort for the occupants as well as the ability of the vehicle to traverse rough, snow covered terrain. The first mounting plate 100 is secured to the top of the tunnel intermediate the ends thereof and the second vertical mounting plate 101 is secured to the top of the tunnel between the forward end of the tunnel and the first vertical mounting plate. These plates are positioned so that each of the tunnels, as best seen in FIG. 2, 5, 8 and 9, is generally under the vehicle. It is preferred that the axle assemblies 40 of the vehicle are positioned closer to the center of the tunnels than the rear ends thereof. This preferred positioning provides the weight distribution for optimum traction from the track assemblies.

Figure 6:
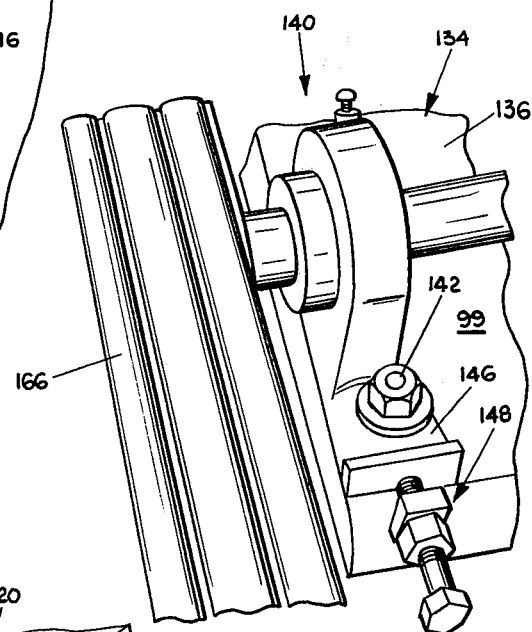
FIG. 6 is a top, perspective, fragmentary view of a portion of the drive system for the rear track assemblies.

As best seen in FIGS. 1 and 5-9, each endless track 92 is driven indirectly by hub 38 through a drive assembly which includes a drive member 131 non-rotatably secured to the hub 38. The hub 38 includes wheel attaching studs 132. The drive member 131 is bolted to the wheel attaching studs 132. Positioned forward of the second vertical mounting plate 101 is countershaft assembly 134. The countershaft assembly 134 includes channel-shaped mounting plate 136 and spaced bearing assemblies 138, 140. The outboard bearing assembly 140 is secured to the top of the channel mounting plate 136 by bolts 142 extending through mounting flanges 146 and into an elongated slot (not shown) formed in the top of the mounting plate 136. A bolt adjuster 148 is preferably provided at both the forward and rear ends of the bearing assembly to adjustably lock the bearing assembly in place (FIGS. 6 and 7). The inboard bearing assembly 138 is similarly mounted to the top of the mounting plate 136 by bolts 150 and adjustment bolts 152.

Rotatably supported by the bearing assemblies 138, 140 is a countershaft 160. Non-rotatably secured to the outboard end of the countershaft 160 is a driven member 162. Non-rotatably secured to the inner end of the countershaft 160 is a second driven member 164. As seen in FIGS. 1, 5, 6 and 7, the driven member 162 and the drive member 131 may take the form of pulleys interconnected by flexible, endless transmission members such as V-belts 166. In the preferred form, however, the drive member 130 and the driven member 162 take the form of chain sprockets and the drive transmission members take the form of endless chains. This is partially shown in FIGS. 8 and 9 wherein the flexible transmission member connecting the countershaft member 164 and a track driven member 172 is a chain 170.

The drive means of the present invention, therefore, indirectly drives the track at the forward end thereof from the axle through a pair of endless drive transmission means interconnecting the hub with the track drive shaft through an adjustably mounted countershaft. The multiple sprocket or driven member arrangement of the drive system permits proper selection of the overall drive ratio for optimum torque and traction. Preferably, the overall drive ratio from the rear hub to the endless track is greater than one. This mounting arrangement including the forward drive permits the vehicle to obtain relatively high speeds when compared to converted snow vehicles heretofore available. Further, since the tunnels are positioned so that the drive axles of the vehicle are intermediate the ends thereof and the track is driven at its forward end, more efficient weight distribution is obtained resulting in an optimizing of traction. The flexible members 166 and 170 are preferably covered by housings 180, 182, respectively, bolted to the top of the tunnel 90.

Figure 10:
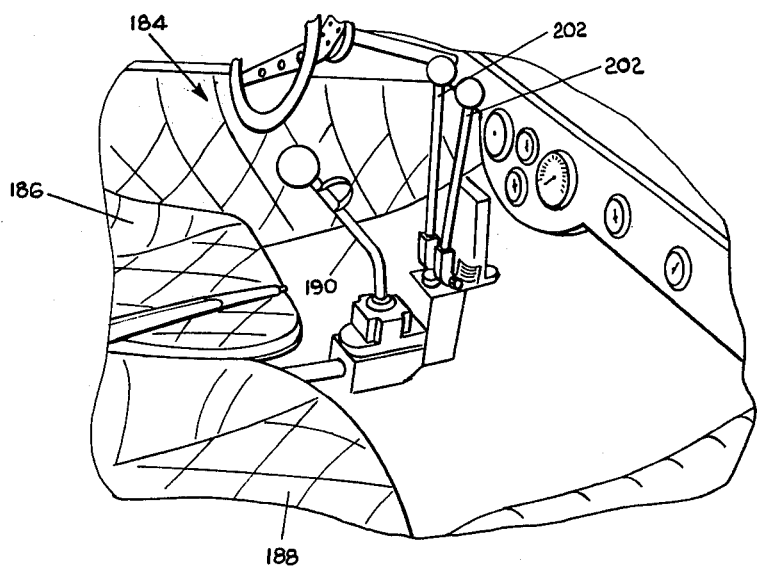
FIG. 10 is a fragmentary, perspective view of the cockpit of the vehicle showing a portion of the brake arrangement.

The cockpit 184 of the vehicle may include a pair of seats 186, 188 and complete instrumentation, as best seen in FIG. 10. The conventional transmission including the floor mounted gearshift 190 is retained. The cockpit 184 of the vehicle may be covered with a suitable vinyl or other flexible top to protect the occupants from the elements.

Figure 13:
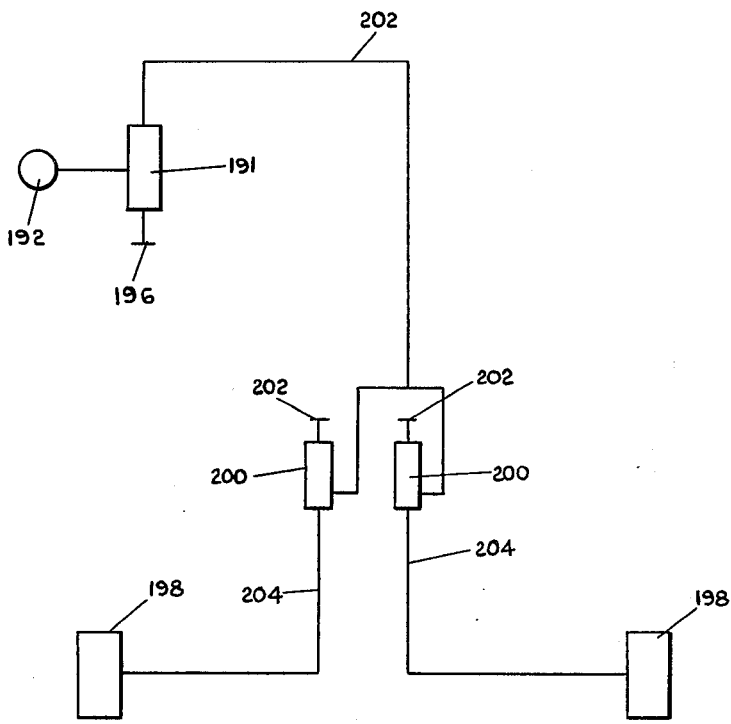
FIG. 13 is a schematic illustrating the hydraulic brake system for the vehicle.

In adapting the conventional dune buggy type recreational vehicle for use as a snow covered terrain vehicle, it is preferred that the brake system be modified slightly, as seen in FIGS. 10 and 13 to permit selective braking of either or both of the track assemblies. The conventional braking system, as schematically illustrated in FIG. 13, includes a master cylinder 191 supplied with hydraulic fluid from a reservoir 192 and activated by a foot actuated pedal 196. The conventional master cylinder 191 supplies pressurized, hydraulic fluid to brake assemblies 198 illustrated schematically in FIG. 13 engaging the rear hubs of the axle assemblies. The modification in the braking system includes providing a pair of piston-cylinder actuators 200 each having hand operated levers 202. The master cylinder 191 is connected to the actuators 200 through a line 203. The line 203 connects with each of the actuators downstream of the pistons (not shown) contained therein. The outlet of each of the actuators 200 is then connected to the brake assemblies 198 by suitable lines 204. Should the vehicle operator depress the pedal 196, pressurized fluid would be transmitted through the lines 203 and 204 to the brake assemblies 198 thereby braking both track assemblies. For turning purposes, however, an operator would operate either of the levers 202 thereby selectively pressurizing either of the brake means 198. This brake system modification in conjunction with the ski assemblies secured to the steering system of the vehicle increases the ease by which the vehicle may be controlled and decreases the turning radius. This increased flexibility substantially increases the ease and efficiency of operation of the vehicle in heavy snow-covered terrain.

As should now be apparent, a conventional vehicle having a rear driven axle is readily converted to a snow vehicle by removal of the conventional front spindle wheels and substitution of the ski assemblies 22. Next, the rear wheels are removed and the track assemblies 24 are bolted to the vehicle frame 12 and to the axle flange 46 of the vehicle. Rigid strut 112 is substituted at the rear of the vehicle for the conventional spring shock absorber rear suspension. The vehicle is easily and readily converted back to street use by removal of the ski assemblies and substitution of conventional spindle and wheel assemblies or by securement of the trailer type wheels to the ski assemblies, as shown in FIGS. 3 and 4. The rear track assemblies 24 are easily detached by removal of the three bolts at each assembly. The driven members 131 are then removed from the hubs and the conventional, rear wheels are substituted.

The unique conversion apparatus and the converted snow vehicle in accordance with the present invention provide for optimum use of the conventional all-terrain, recreation or passenger vehicles for use in traversing rugged, snow-covered terrain. The apparatus provides all the benefits of track systems and retains a four-point suspension permitting traverse of difficult terrain with maximum comfort for the occupants. The mounting and positioning of the track assemblies maximizes traction by weight distribution and the resulting vehicle is capable of relatively high speeds when compared to previously converted vehicles. The mounting arrangement including the elongated, tension members extending from gussets on the frame to the front mounting plates provides a rugged, yet simple and easily attached and detached mounting for the track assemblies. Front impact loading of the track assemblies is readily handled by the mounting arrangement. The apparatus may be fabricated from sheet metal. The endless track components including the bogie wheel suspension and the front skis are readily available, commercial items.

It can therefore be seen, that the present invention substantially reduces the problems encountered with prior proposals relating to complexity, proper weight distribution, proper suspension, and time requirements for attachment and detachment. In view of the foregoing description, various modifications will undoubtedly now become apparent to those of ordinary skill in the art. For example, as set forth above, the drive may be of an endless chain and sprocket arrangement or may be of a pulley and V-belt arrangement. Further, the manner by which the mounting plates are adjustably secured either to the vehicle or to the tunnel may be reversed. Also, the struts could be mounted on the outside of the trailing arms. Therefore, it is expressly intended that the above description should be considered as that of the preferred embodiment. The true spirit and scope of the present invention may be determined by reference to the appended claims.

The embodiments of the invention in which an exclusive property or privilege is claimed are defines as follows.

1. Apparatus for converting a conventional, powered vehicle from street use to snow or rough terrain use, said vehicle being of the type having a frame, steering means including front wheel spindle mounting means having a pair of trailing arms and steering tie rods connectable to the front wheel spindles, a pair of rear axle assemblies, each including an axle housing, an axle rotatable within said housing and connectable to a source of power through a differential, an axle flange on said axle housing normally adapted to mount a shock absorber between said flange and the vehicle frame, and a driven hub rotated by said axle and including wheel mounting studs, said apparatus comprising:

a pair of ski assemblies, each securable to said trailing arms and including a strut mounted on the inside of said trailing arms upon removal of the conventional front wheels spindles, a ski shaft extending through said strut, a tie rod connected at the top end of said ski shaft, a ski non-rotatably mounted on the lower end of said ski shaft;

a pair of endless track assemblies each including a tunnel, an endless flexible track, a forward drive shaft and a plurality of bogie wheels mounted within said tunnel, said track being driven by said forward drive shaft, said endless track assemblies each further comprising:

a first vertical mounting plate adjustably secured to the top of said tunnel intermediate the ends thereof and secured to an axle flange;

a second vertical mounting plate secured to the top of said tunnel between the forward end of said tunnel and said first vertical mounting plate and adjustably secured to said vehicle frame, said mounting plates positioned so that each of said tunnels is positioned generally under said vehicle and said hubs are positioned above and intermediate the ends of said tunnels, said apparatus further comprising:

a rigid link secured at one end to said vehicle frame and at the other end to said axle so that said tunnel is rigid with said vehicle frame;

a drive member mounted on said hub at said wheel mounting studs;

a driven shaft rotatably mounted on the top of said tunnel;

first endless, flexible drive transmission means for connecting said drive member to said tunnel mounted driven shaft;

second endless, flexible drive transmission means for connecting said tunnel mounted driven shaft to said endless track forward drive shaft;

a gusset secured to said vehicle frame forward of said second vertical mounting plate; and an elongated, adjustable tension member extending from said gusset to said second vertical mounting plate, said tension member absorbing shock loads imparted to the forward end of said tunnel.

2. An apparatus as defined by claim 1 further including means for adjustably mounting said driven shaft on the top of said tunnel whereby the tension of said first drive transmission means may be adjusted.

3. An apparatus as defined by claim 2 further including brake means operatively engaging each of said hubs for selectively braking either or both of said hubs.

4. An apparatus as defined by claim 3 wherein said mounting plates are positioned so that the outboard lateral edges of each of said tunnels are positioned within the length of said rear axle assemblies and hubs are disposed adjacent the center of said tunnels.

5. An apparatus as defined by claim 4 wherein said first flexible drive transmission means includes:

a sprocket non-rotatably mounted at the outboard end of said driven shaft; and an endless chain connecting said sprocket to said drive member, said drive member being a sprocket having a diameter greater than said driven shaft sprocket.

6. An apparatus as defined by claim 5 wherein said second vertical mounting plate is secured to said tunnel adjacent said driven shaft.

7. An apparatus as defined by claim 6 wherein said tension member is an elongated bolt extending through said gusset and said second vertical mounting plate, said bolt threadably carrying a pair of nuts, one on each side of said second plate.

8. A vehicle for snow-covered terrain, comprising:
a tubular frame;
an internal combustion engine and transaxle mounted at the rear of said frame;
a pair of endless track assemblies positioned perpendicular to said transaxle, each including an elongated tunnel, an endless track, a drive shaft extending from an inboard side of said tunnel at a forward end thereof and bogie wheel suspension means within said tunnel for engaging said track, said drive shaft operatively engaging said track;
means for rigidly securing each of said track assemblies to said vehicle frame, said securing means including a first member connecting said tunnel to said transaxle, a second member positioned forward of said first member connecting said tunnel to said frame, a rigid strut connecting said transaxle to said frame adjacent an end of said transaxle so that all rear suspension is provided by said track assemblies, said tunnel being positioned so that said transaxle is adjacent the center thereof and terminates adjacent the outboard lateral edge of said tunnel;
transmission means for each of said track assemblies for transmitting rotary motion from said transaxle to said endless track drive shaft at the forward end and inboard of said tunnel; and
a front, steering means including a pair of spindle support means mounted on each side of said frame adjacent the front thereof, a ski strut supported by said spindle support means and including a spindle shaft, a lever arm secured to the top of said spindle shaft and a ski secured to the lower end of said spindle shaft.

9. A vehicle as defined by claim 8 wherein said transmission means comprises:
a hub driven by said transaxle and having wheel mounting studs thereon;
a circular drive member mounted on said studs;
a countershaft;
means adjustably positioning and rotatably mounting said countershaft on said tunnel forward of said second member, said countershaft including first and second circular drive members on the ends thereof;
a flexible, endless drive transmission member connecting said hub drive member to said first circular drive member; and
another flexible, endless drive transmission member connecting said second circular drive member to said endless track drive shaft, said transmission means having an overall drive ratio greater than one.

10. A vehicle as defined by claim 9 further including:
a gusset secured to the underside of said frame forward of said secured member; and
an elongated tension and adjustment member extending from said gusset to said second member for absorbing impact loads imparted to the forward end of said tunnel.

* * * * *